US012486704B2

(12) United States Patent
Mankar et al.

(10) Patent No.: US 12,486,704 B2

(45) Date of Patent: Dec. 2, 2025

(54) HOOD HINGE

(71) Applicant: International Truck Intellectual Property Company, LLC, Lisle, IL (US)

(72) Inventors: Nandkishor Wasudeorao Mankar, Pune Maharashtra State (IN); Robert Remeika, Forest Park, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 18 days.

(21) Appl. No.: 18/530,446

(22) Filed: Dec. 6, 2023

(65) Prior Publication Data

US 2025/0188782 A1 Jun. 12, 2025

(51) Int. Cl.

*E05F 1/08* (2006.01)

*E05F 1/10* (2006.01)

(52) U.S. Cl.

CPC ....... *E05F 1/1016* (2013.01); *E05Y 2900/536* (2013.01)

(58) Field of Classification Search

CPC ..... E05F 1/1016; E05F 1/1058; E05F 1/1253; E05F 1/105; E05F 1/1041; E05F 1/1261; E05F 1/1075; E05F 3/20; E05Y 2201/416; E05Y 2201/638; E05Y 2201/696; E05Y 2201/688; E05Y 2900/536; E05Y 2900/608; E05D 3/18; E05D 15/30

See application file for complete search history.

(56) References Cited

U.S. PATENT DOCUMENTS

| | | | |
|---|---|---|---|
| 2,430,728 | A | 11/1947 | Mott |
| 2,433,148 | A | 12/1947 | Orelind et al. |
| 2,485,015 | A | 10/1949 | Radtke |
| 2,644,697 | A | 7/1953 | Peterson |
| 2,654,118 | A | 10/1953 | Scott |
| 2,656,562 | A | 10/1953 | Phillips |
| 2,677,147 | A | 5/1954 | Phillips |
| 2,680,534 | A | 6/1954 | Penfold |
| 2,724,867 | A | 11/1955 | Smith |
| 2,761,692 | A | 9/1956 | Sisulak |
| 2,817,870 | A | 12/1957 | Lester |
| 2,889,153 | A | 6/1959 | Kowalik |

(Continued)

FOREIGN PATENT DOCUMENTS

| | | | | |
|---|---|---|---|---|
| CN | 208416240 | U | * | 1/2019 |
| CN | 215595293 | U | * | 1/2022 |

(Continued)

*Primary Examiner* — Chuck Y Mah

(74) *Attorney, Agent, or Firm* — Umang Khanna

(57) ABSTRACT

A hood hinge includes a hood mounting bar, a housing tube having first and second open ends, and a first bracket fixedly connecting the hood mounting bar to the housing tube. A rubber insulator is disposed within each of the first and second ends of the housing tube, and a self-lubricated bushing is disposed within each rubber insulator. A first torsion spring is disposed around the housing tube proximate to the first end of the housing tube. A second bracket has a base and first and second flaps extending from the base over the first and second ends of the housing tube, respectively, and a hinge pin is disposed through the first and second flaps, the self-lubricated bushings, and the housing tube.

20 Claims, 6 Drawing Sheets

(56) References Cited

U.S. PATENT DOCUMENTS

| | | | | |
|---|---|---|---|---|
| 2,940,785 | A * | 6/1960 | Haushalter | F16C 27/08 267/282 |
| 3,462,860 | A | 8/1969 | Duke et al. | |
| 3,554,294 | A | 1/1971 | Morkoski et al. | |
| 3,645,324 | A | 2/1972 | Hicks | |
| 3,650,333 | A | 3/1972 | Fueslein | |
| 3,654,999 | A | 4/1972 | Fischer | |
| 3,693,724 | A | 9/1972 | Fueslein et al. | |
| 3,713,495 | A | 1/1973 | Redford | |
| 3,982,600 | A | 9/1976 | Gerresheim et al. | |
| 4,023,827 | A | 5/1977 | Matalonis et al. | |
| 4,171,726 | A | 10/1979 | Ward | |
| 4,208,162 | A | 6/1980 | Neitzel | |
| 4,301,570 | A | 11/1981 | Thomas | |
| 4,353,146 | A * | 10/1982 | Brockhaus | E05D 5/14 16/385 |
| 4,482,023 | A | 11/1984 | Dziedzic et al. | |
| 4,721,406 | A * | 1/1988 | Davis | E05D 11/081 384/129 |
| 5,101,921 | A | 4/1992 | West et al. | |
| 5,211,695 | A | 5/1993 | Dowler | |
| 6,378,167 | B1 | 4/2002 | Howell, III et al. | |
| 6,463,818 | B1 | 10/2002 | Stagg et al. | |
| 6,494,280 | B1 | 12/2002 | Friend et al. | |
| 6,637,531 | B2 | 10/2003 | Palenchar et al. | |
| 6,792,650 | B2 | 9/2004 | Stagg et al. | |
| 7,588,158 | B2 | 9/2009 | Burstein | |
| 8,096,603 | B2 | 1/2012 | Cassaday | |
| 9,016,773 | B2 | 4/2015 | Tanner et al. | |
| 11,739,580 | B2 * | 8/2023 | Rapp | E05D 3/02 16/54 |
| 2008/0016651 | A1 * | 1/2008 | Marsh | E05D 11/1057 16/361 |
| 2008/0120809 | A1 * | 5/2008 | Nakasone | B60R 7/04 16/338 |
| 2008/0173645 | A1 | 7/2008 | Burnstein et al. | |
| 2009/0106938 | A1 * | 4/2009 | Mori | E05F 1/004 16/277 |
| 2010/0050383 | A1 * | 3/2010 | Wang | F16M 11/10 16/297 |
| 2011/0215606 | A1 * | 9/2011 | Trivedi | B60N 3/00 16/278 |
| 2013/0097809 | A1 * | 4/2013 | Weber | B60N 2/793 29/896.9 |
| 2020/0181963 | A1 * | 6/2020 | Digel | E05D 3/145 |

FOREIGN PATENT DOCUMENTS

| | | | |
|---|---|---|---|
| CN | 216841108 | U * | 6/2022 |
| MX | 9901570 | A | 12/1999 |

* cited by examiner

HOOD HINGE

FIELD OF THE INVENTION

The present disclosure relates generally to hood hinge for a vehicle hood, and more particularly to a hood hinge having a torsional spring assembly that supports the vehicle hood in an open position when pivotally opened beyond a predetermined angle.

BACKGROUND

Existing hood hinges utilize torsion bar mechanisms and/or gas struts that work by compressing a gas within a cylinder to support a vehicle hood and pivotally lift it around a hinge pin. Existing hood hinges can suffer from being hard to open or close, requiring external lubrication, and making excessive noise when being opened or closed. A need therefore exists for a hood hinge that provides for easy opening, can support the hood at a particular angle, allows for easy closing, does not require external lubrication, and is robust to absorb direct shocks and vibrations coming from the road during vehicle motion. It would be beneficial if such a hood hinge could be implemented at less cost and in a smaller physical package than existing hood hinges. It would be further beneficial if such a hood hinge could be easily assembled from off the shelf components and be serviceable to allow for replacement of components requiring replacement.

SUMMARY OF THE INVENTION

In one aspect of the invention, a hood hinge comprises a hood mounting bar, a housing tube having first and second open ends, and a first bracket fixedly connecting the hood mounting bar to the housing tube. A rubber insulator is disposed within each of the first and second ends of the housing tube, and a self-lubricated bushing is disposed within each rubber insulator. A first torsion spring is disposed around the housing tube proximate to the first end of the housing tube. A second bracket has a base and first and second flaps extending from the base over the first and second ends of the housing tube, respectively, and a hinge pin is disposed through the first and second flaps, the self-lubricated bushings, and the housing tube.

In another aspect of the invention, a hood hinge comprises a hood mounting bar, a housing tube having first and second open ends, and a first bracket fixedly connecting the hood mounting bar to the housing tube. A rubber insulator is disposed within each of the first and second ends of the housing tube, and a self-lubricated bushing is disposed within each rubber insulator. The hood hinge further comprises first and second torsion springs, the first torsion spring disposed around the housing tube proximate to the first end of the housing tube and the second torsion spring disposed around the housing tube proximate to the second end of the housing tube. A second bracket has a base and first and second flaps extending from the base over the first and second ends of the housing tube, respectively, and a hinge pin is disposed through the first and second flaps, the self-lubricated bushings, and the housing tube.

In a further aspect of the invention, a hood hinge comprises a welded subassembly, comprising a hood mounting bar adapted to be fixedly attached to a vehicle hood, a housing tube having first and second open ends, and a first bracket welded to the hood mounting bar and the housing tube. A rubber insulator is disposed within each of the first and second ends of the housing tube, and a self-lubricated bushing is disposed within each rubber insulator. The hood hinge further comprises first and second torsion springs, the first torsion spring disposed around the housing tube proximate to the first end of the housing tube and the second torsion spring disposed around the housing tube proximate to the second end of the housing tube. A second bracket has a base and first and second flaps extending from the base over the first and second ends of the housing tube, respectively, wherein the base is adapted to be mounted to a vehicle chassis, and a hinge pin is disposed through the first and second flaps, the self-lubricated bushings, and the housing tube. The first flap comprises a first slot disposed therethrough and a first end of the first torsion spring is disposed through the first slot, the second flap comprises a second slot disposed therethrough and a first end of the second torsion spring is disposed through the second slot, the first bracket comprises a first hole disposed therethrough and a second end of the first torsion spring is disposed through the first hole, and the first bracket comprises a second hole disposed therethrough and a second end of the second torsion spring is disposed through the second hole.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope.

Figure 1:
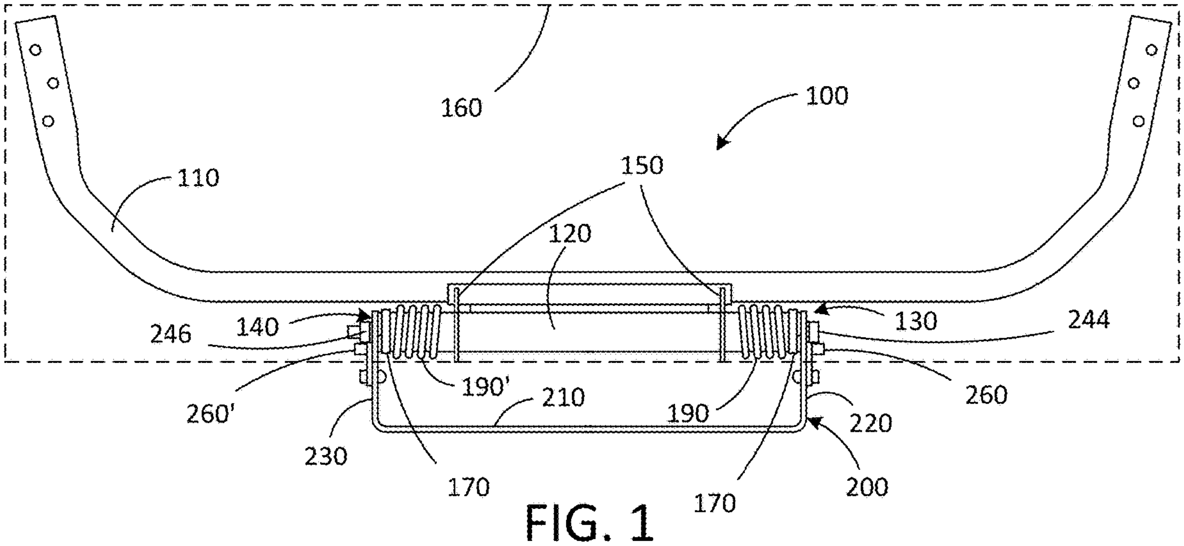
FIG. 1 is a schematic diagram of an exemplary hood hinge according to an embodiment.

In the following detailed description, various embodiments are described with reference to the appended drawings. The skilled person will understand that the accompanying drawings are schematic and simplified for clarity. Like reference numerals refer to like elements or components throughout. Like elements or components will therefore not necessarily be described in detail with respect to each figure.

DETAILED DESCRIPTION

Figure 2:
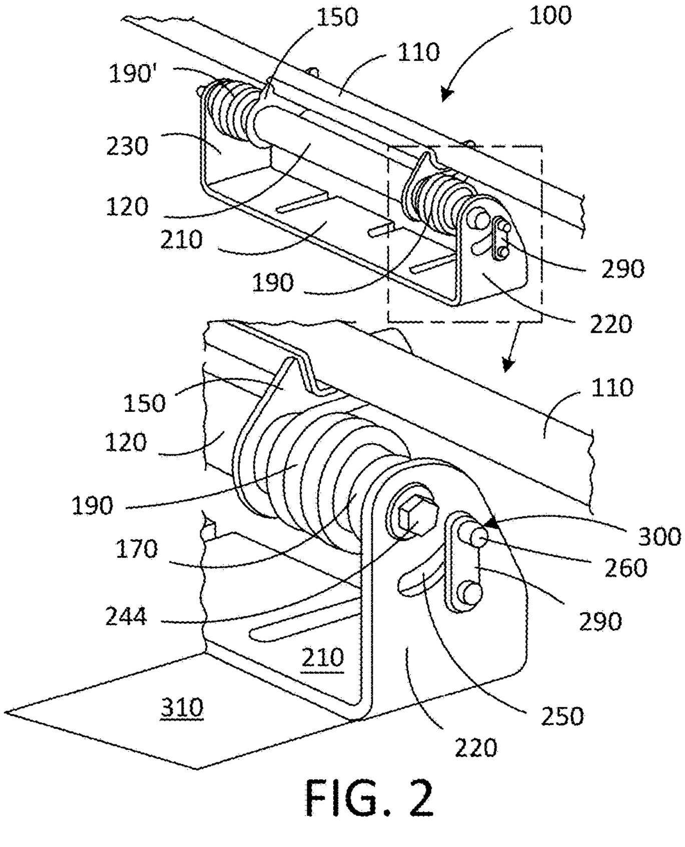
FIG. 2 is a schematic diagram of a central portion of the hood hinge of FIG. 1, and including an enlarged region of the central portion.

Referring to FIGS. 1 and 2, an exemplary hood hinge 100 comprises a hood mounting bar 110, a housing tube 120 having first 130 and second 140 open ends, and a first bracket 150 fixedly connecting the hood mounting bar 110 to the housing tube 120. In an embodiment, the first bracket 150 fixedly connects the hood mounting bar 110 to the housing tube 120, for example without limitation, by welding, thereby forming a first subassembly 160 as indicated by the dashed rectangle 160 in FIG. 1.

Referring now to FIGS. 1-3 and 5, in an embodiment, a rubber insulator 170 is disposed within each of the first 130 and second 140 ends of the housing tube 120, for example without limitation, by being press fit into the housing tube 120. In an embodiment, a self-lubricated bushing 180 is disposed within each rubber insulator 170. Without being held to theory, it is believed that the rubber insulator 170 minimizes the intensity of shocks and vibrations coming to the hinge pin 240 (see below) from a road surface. In an embodiment, a first torsion spring 190 is disposed around the housing tube 120 proximate to the first end 130 of the housing tube 120. In an embodiment, a second bracket 200 comprises a base 210 and first 220 and second 230 flaps extending from the base 210.

Figure 5:
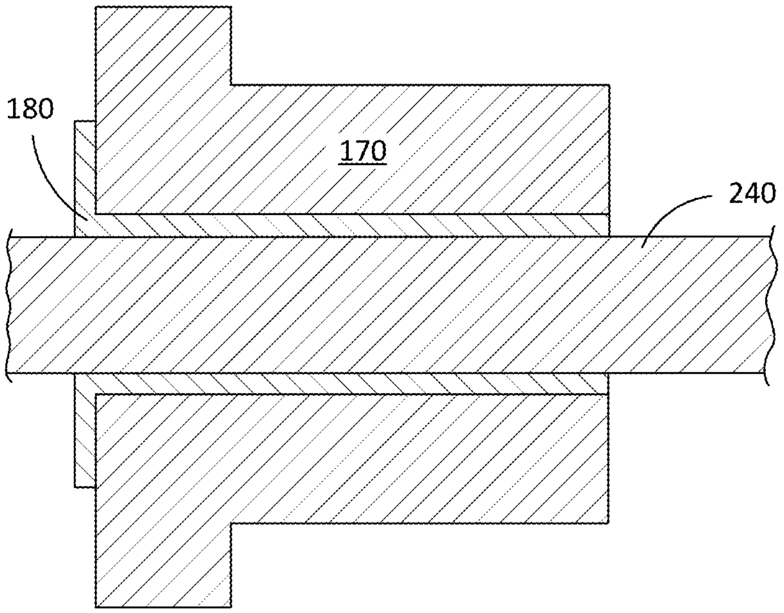
FIG. 5 is a schematic cross-sectional diagram taken generally through the self-lubricating bushing 180 and rubber insulator 170 assembled over a hinge pin 240, according to an embodiment.

When assembled to the first subassembly 160, the first 220 and second 230 flaps extend over the first 130 and second 140 ends of the housing tube 120, respectively. In an embodiment, a hinge pin 240 is disposed through the first 220 and second 230 flaps, the self-lubricated bushings 180, and the housing tube 120. In an embodiment, the hinge pin 240 comprises a bolt 244 and a nut 246. Referring to FIG. 5, a self-lubricated bushing 180 is illustrated in cross-section as press fit into a rubber insulator 170 with the hinge pin 240 disposed through the self-lubricated bushing 180. In an embodiment, the self-lubricated bushing 180 is made from graphite.

Figure 3:
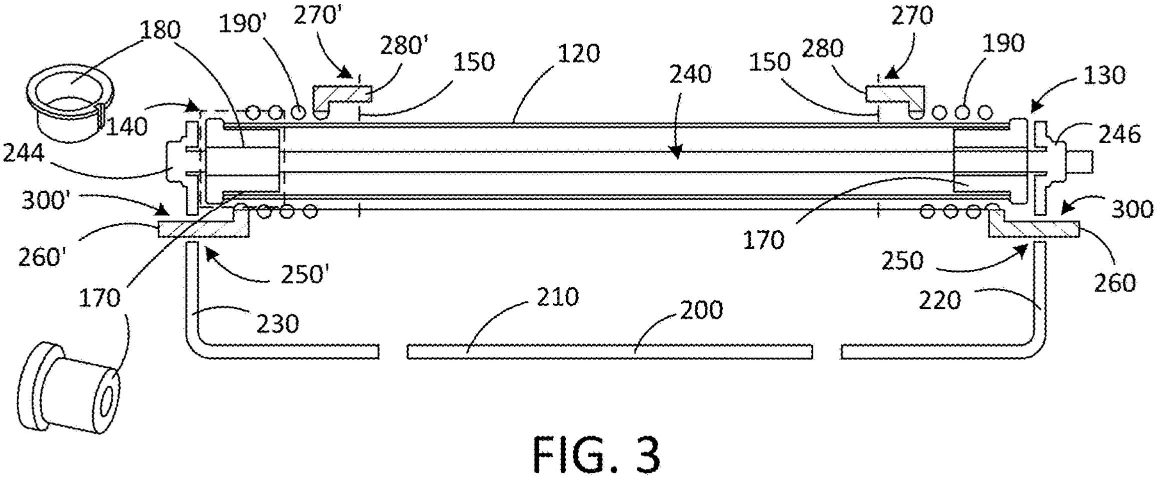
FIG. 3 is a schematic cross-sectional diagram of an exemplary hood hinge according to an embodiment, taken generally through the second bracket 200.
Figure 4:
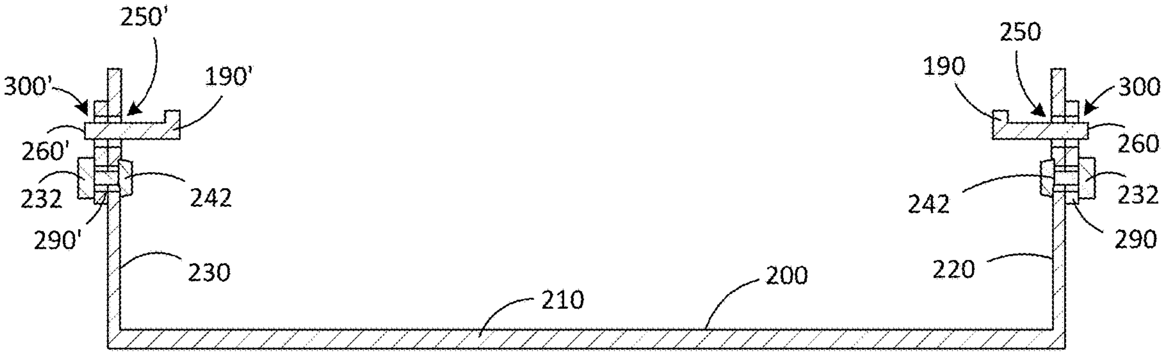
FIG. 4 is a schematic cross-sectional diagram of an exemplary hood hinge according to an embodiment, taken generally through the hinge pin 240.
Figure 6:
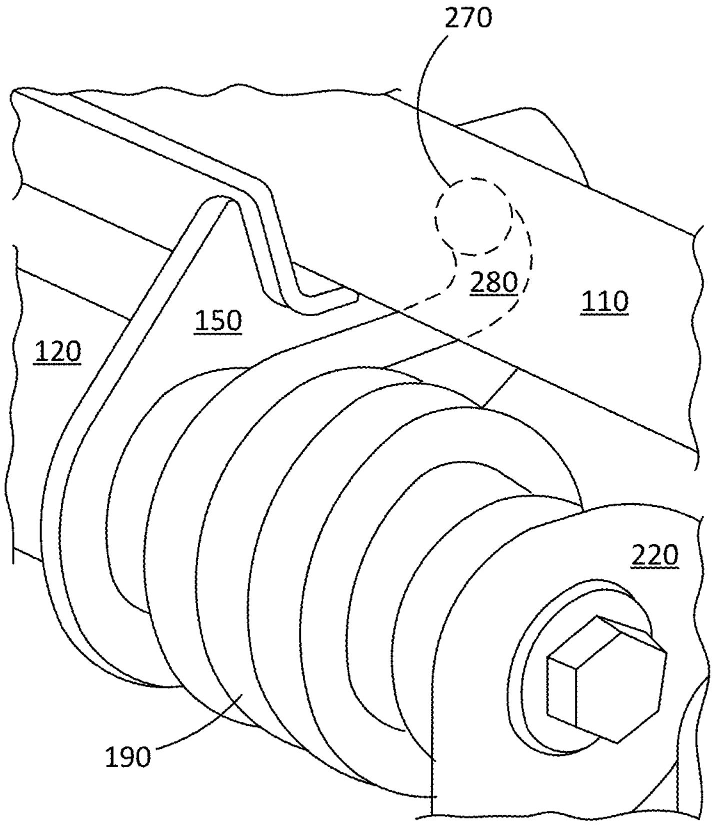
FIG. 6 is a schematic enlarged view of a first torsional spring 190 attached over the first end of the housing tube 120, according to an embodiment.

Referring to FIGS. 2-4, in an embodiment, the first flap 220 comprises a slot 250 disposed therethrough and a first end 260 of the first torsion spring 190 is disposed through the slot 250. Referring to FIG. 5, which shows an expanded view of the first end 130 of the housing tube 120, in an embodiment, the first bracket 150 comprises a first hole 270 (see also FIG. 3) disposed therethrough and a second end 280 of the first torsion spring 190 is disposed through the first hole 270. The first hole 270 and the second end 280 of the first torsion spring 190 are shown as dashed lines in FIG. 6 because they are behind the hood mounting bar 110.

Referring to FIGS. 2 and 4, in an embodiment, a first spring locking bracket 290 is attached to the first flap 220 and comprises a second hole 300 disposed therethrough, wherein the first end 260 of the first torsion spring 190 is disposed through the second hole 300.

Figure 7:
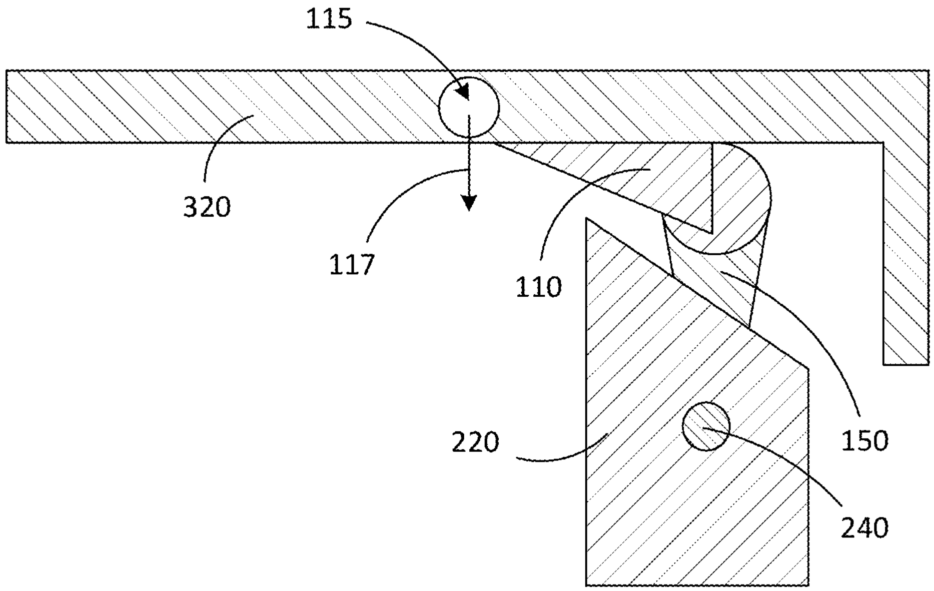
FIG. 7 is a schematic cross-sectional diagram of an exemplary hood hinge 100 attached to a vehicle hood 320 illustrating the vehicle hood 320 in a closed position, according to an embodiment.
Figure 8:
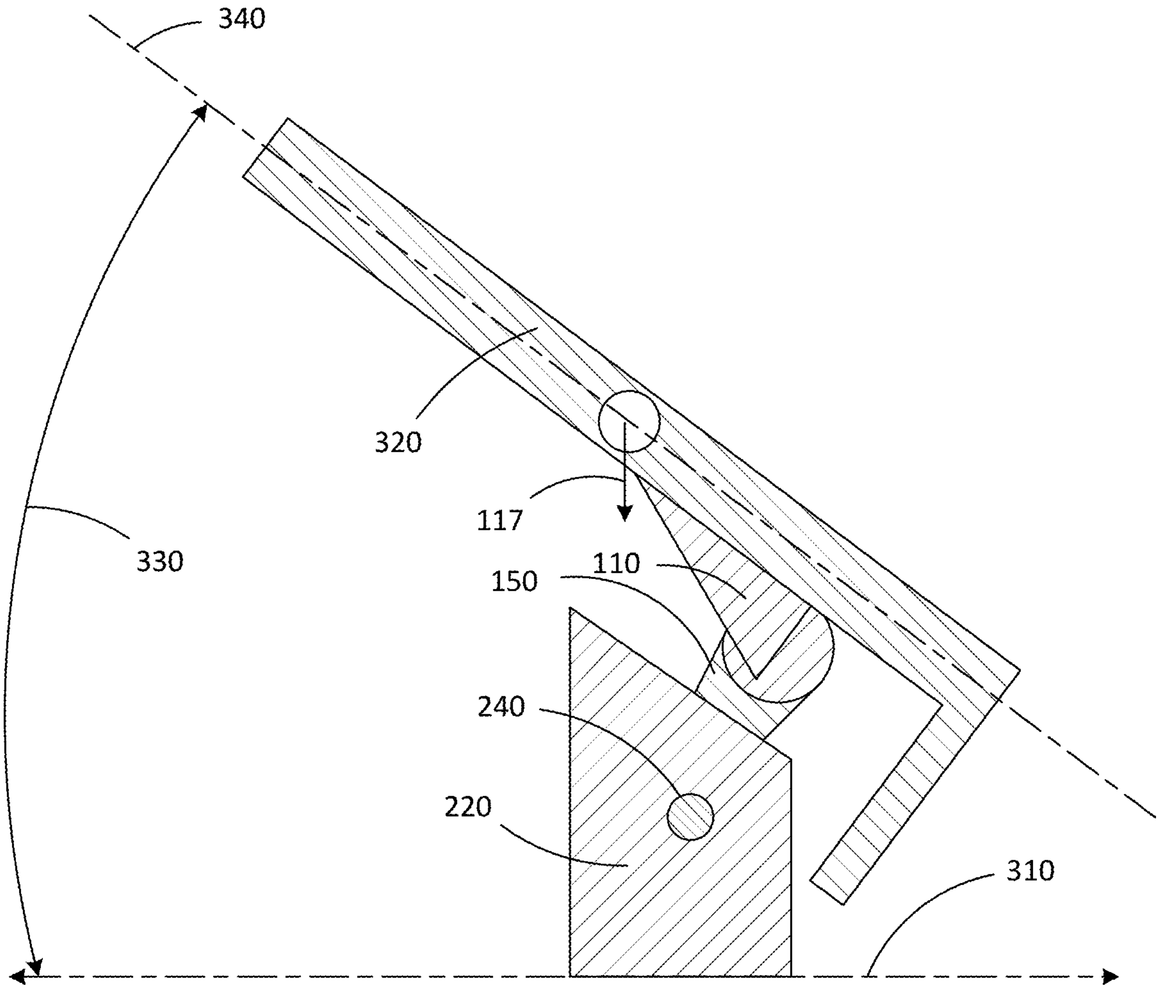
FIG. 8 is a schematic cross-sectional diagram of an exemplary hood hinge 100 attached to a vehicle hood 320 illustrating the vehicle hood 320 in an open position, according to an embodiment.

Referring to FIGS. 2, 7, and 8, in an embodiment the base 210 of the second bracket 200 defines a plane 310 and is adapted to be mounted to a vehicle chassis (not shown). In an embodiment, the hood mounting bar 110 is adapted to mount a vehicle hood 320, for example without limitation, by being bolted or otherwise fastened to the vehicle hood. In an embodiment the hood hinge 100 pivotally supports the vehicle hood 320 at an angle 330 defined between the plane 310 and a line 340 passing through the vehicle hood 320.

Referring to FIGS. 1-3, in an embodiment, the hood hinge 100 further comprises a second torsion spring 190' disposed around the housing tube 120 proximate to the second end 140 of the housing tube 120. In this embodiment, all of the structural relationships between the first torsion spring 190 and the components surrounding and in contact with it also apply analogously to the second torsion spring 190'. For example, in this embodiment the first flap 220 comprises a first slot 250 disposed therethrough, and a first end 260 of the first torsion spring 190 is disposed through the first slot 250, and analogously the second flap 230 comprises a second slot 250' (see FIG. 3) disposed therethrough and a first end 260' of the second torsion spring 190' is disposed through the second slot 250'. In this embodiment, the first bracket 150 comprises a first hole 270 disposed therethrough and a second end 280 of the first torsion spring 190 is disposed through the first hole 270, and the first bracket 150 further comprises a second hole 270' disposed therethrough and a second end 280' of the second torsion spring 190' is disposed through the second hole 270'.

The first ends 260, 260' of the first and second torsion springs 190, 190', disposed through the slots 250 and 250', are free to move within the slots 250, 250'. Referring to FIGS. 1, 2, and 4, in an embodiment the hood hinge 100 further comprises first 290 and second 290' spring locking brackets, that inhibit the first ends 260, 260' from moving. In an embodiment, the first spring locking bracket 290 is attached to the first flap 220 and comprises a hole 300 disposed therethrough, wherein the first end 260 of the first torsion spring 190 is disposed through the hole 300. Analogously, the second spring locking bracket 290' is attached to the second flap 230 and comprises a hole 300' disposed therethrough, wherein the first end 260' of the second torsion spring 190' is disposed through the hole 300'. In an embodiment, the first and second spring locking brackets 290, 290' are attached to the first and second flaps 220, 230, respectively by, for example without limitation, a bolt 232 and a nut 242, wherein the bolt 232 is disposed through each of the first and second spring locking brackets 290, 290' and each of the respective first and second flaps 220, 230, and secured by the nut 242. In other embodiments, the first and second spring locking brackets 290, 290' are attached to the first and second flaps 220, 230, respectively by, welding, adhesive, or other mechanisms for attachment.

Referring again to FIGS. 7 and 8, in an embodiment the hood mounting bar 110 is attached to a vehicle hood 320 having a center of gravity disposed approximately within the circle 115 and resulting in a downward force as shown by the arrow 117. When the vehicle hood 320 is a closed position as shown in FIG. 7, the center of gravity 115 is further to the left of the hinge pin 240 than when the vehicle hood 320 is an open position, for example as shown in FIG. 8. The vehicle hood 320 pivots to open, thereby increasing the angle 330 measured between the plane 310 and the line 340 disposed through the vehicle hood 320, from about zero degrees in FIG. 7 to some finite non-zero angle 330 in FIG. 8. As the vehicle hood 320 opens, the center of gravity 115 moves to the right in FIG. 8, thereby decreasing the moment of the force of gravity 117 taken around the hinge pin 240, which decreases the torsional force of gravity around the hinge pin 240.

Without being held to theory, one or both of the first and second torsion springs 190, 190' can be sized and made having the appropriate coil radius and material diameters, be made from the appropriate materials, having the appropriate number of turns, and having the appropriate spring constants to support the vehicle hood 320 once it has reached a predetermined minimum value for the angle 330, which corresponds to having a torsional force of gravity around the hinge pin 240 that is less than the torsional force supplied by one or both of the first and second torsion springs 190, 190'. However, if the vehicle hood 320 is raised to an angle 330 less than the predetermined minimum angle, then upon release, one or both of the first and second torsion springs 190, 190' will provide insufficient torsion force to keep the vehicle hood 320 raised and it will pivotally close.

For example, in an embodiment, the first torsion spring 190 is adapted to support the vehicle hood 320 when pivotally raised to an angle 330 of about fifty degrees or more relative to the plane 310 of the second bracket 200. In another embodiment, the first and second torsion springs 190, 190' are adapted to support the vehicle hood 320 when pivotally raised to an angle 330 of about fifty degrees or more relative to the plane 310 of the second bracket 200. In either embodiment, when the vehicle hood 320 is raised to an angle 330 that is below about 50 degrees, the center of gravity 115 of the vehicle hood 320 creates a sufficient moment around the hinge pin 240 such that the vehicle hood 320 slowly falls closed against the torsional bias of the springs 190, 190'.

Figure 9:
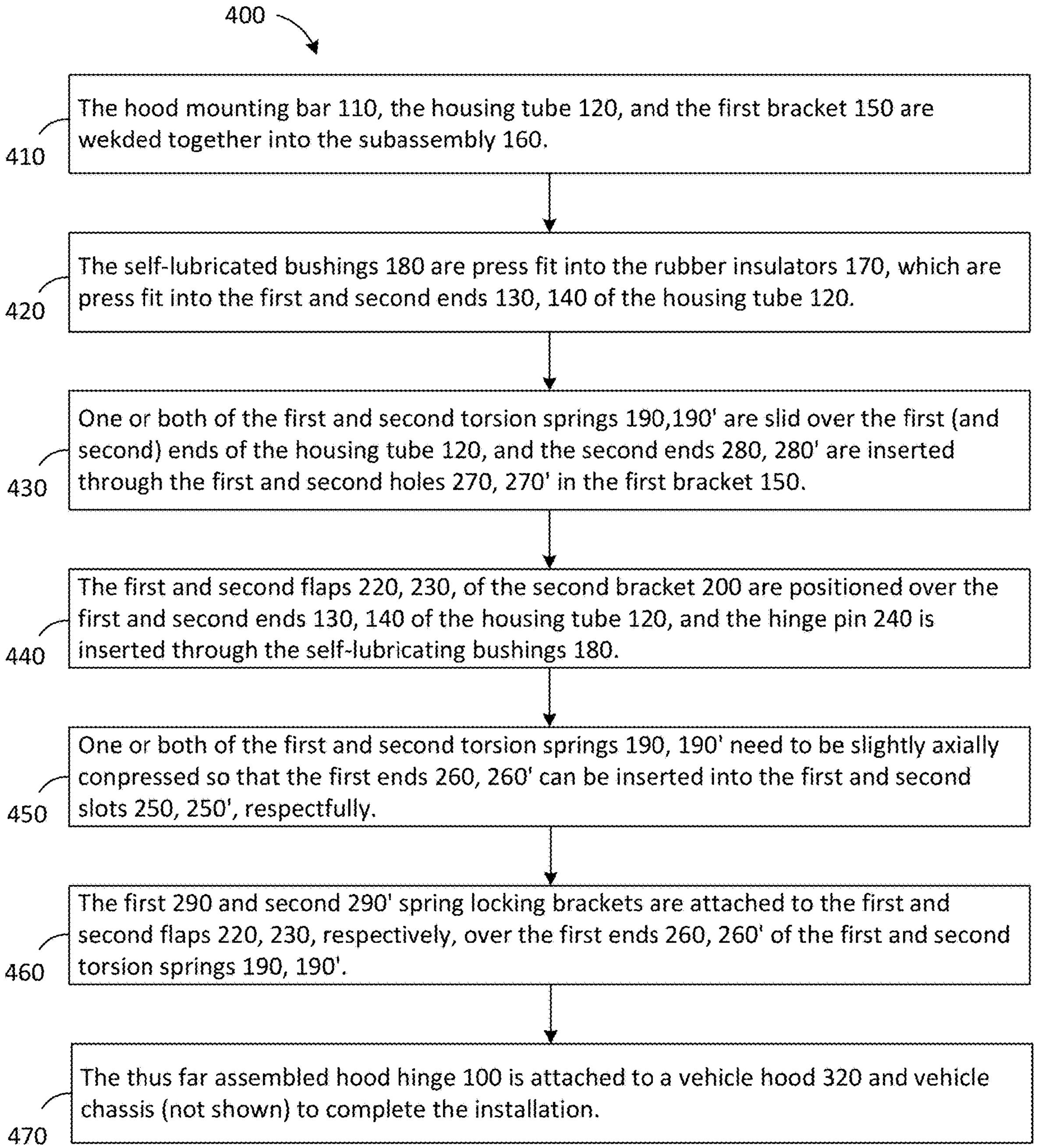
FIG. 9 illustrates the steps of a method for manufacturing an exemplary hood hinge, according to an embodiment.

In an embodiment, the hood hinge 100 is easily manufactured, for example without limitation, by a method of assembly 400 as illustrated in FIG. 9. At step 410, the hood mounting bar 110, the housing tube 120, and the first bracket 150 are welded together into the subassembly 160. At step 420, the self-lubricated bushings 180 are press fit into the rubber insulators 170, which are press fit into the first and second ends 130, 140 of the housing tube 120. At step 430, one or both of the first and second torsion springs 190, 190' are slid over the first (and second) ends of the housing tube 120, and the second ends 280, 280' are inserted through the first and second holes 270, 270' in the first bracket 150. At step 440, the first and second flaps 220, 230 of the second bracket 200 are positioned over the first and second ends 130, 140 of the housing tube 120, and the hinge pin 240 is inserted through the self-lubricating bushings 180. At step 450, one or both of the first and second torsion springs 190, 190' need to be slightly axially compressed so that the first ends 260, 260' can be inserted into the first and second slots 250, 250', respectfully. At step 460, the first 290 and second 290' spring locking brackets are attached to the first and second flaps 220, 230, respectively, over the first ends 260, 260' of the first and second torsion springs 190, 190'. At step 470, the thus far assembled hood hinge 100 is attached to a vehicle hood 320 and vehicle chassis (not shown) to complete the installation.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity. Unless otherwise noted, the use of the words "approximate," "about," "around," "substantially," etc., mean plus or minus ten percent.

INDUSTRIAL APPLICABILITY

A hood hinge is presented that is easily assembled from off the shelf components. The hood hinge can support a vehicle hood in a pivotal position when raised beyond a predetermined angle, and allows the vehicle hood to close when raised to less than the predetermined angle. The hood hinge can be manufactured in industry for use on vehicles purchased by consumers.

Numerous modifications to the present invention will be apparent to those skilled in the art in view of the foregoing description. It is not desired to limit the invention to the exact construction and operation shown and described, and accordingly, all suitable modifications and equivalents may be resorted to, falling within the scope of the invention. Accordingly, this description is to be construed as illustrative only of the principles of the invention and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated by reference herein in their entirety.

We claim:

1. A hood hinge for pivotally mounting a vehicle hood to a vehicle chassis, comprising:
- a hood mounting bar adapted to mount a vehicle hood;
- a housing tube having first and second open ends;
- a first bracket fixedly connecting the hood mounting bar to the housing tube;
- a rubber insulator disposed within each of the first and second ends of the housing tube;
- a self-lubricated bushing disposed within each rubber insulator;
- a first torsion spring disposed around the housing tube proximate to the first end of the housing tube;
- a second bracket adapted to be mounted to a vehicle chassis and having a base and first and second flaps extending from the base over the first and second ends of the housing tube, respectively; said first tension spring acting between said first bracket and said second bracket; and
- a hinge pin disposed through the first and second flaps, the self-lubricated bushings, and the housing tube so that the housing tube and hood mounting bar are pivotable about the hinge pin relative to the second bracket, thereby enabling the vehicle hood to pivot between open and closed positions relative to the vehicle chassis.

2. The hood hinge of claim 1, wherein the first flap comprises a slot disposed therethrough and a first end of the first torsion spring is disposed through the slot, and wherein the first bracket comprises a first hole disposed therethrough and a second end of the first torsion spring is disposed through the first hole.

3. The hood hinge of claim 2, further comprising a first spring locking bracket that is attached to the first flap and comprises a second hole disposed therethrough, wherein the first end of the first torsion spring is disposed through the second hole.

4. The hood hinge of claim 3, wherein the base of the second bracket defines a plane.

5. The hood hinge of claim 4, wherein the first torsion spring is adapted to support the vehicle hood pivotally raised to an angle of about fifty degrees or more relative to the plane of the second bracket.

6. The hood hinge of claim 1, wherein the first bracket fixedly connects the hood mounting bar to the housing tube by welding, thereby forming a first subassembly.

7. The hood hinge of claim 1, further comprising a second torsion spring disposed around the housing tube proximate to the second end of the housing tube.

8. The hood hinge of claim 7, wherein the first flap comprises a first slot disposed therethrough and a first end of the first torsion spring is disposed through the first slot, the second flap comprises a second slot disposed therethrough and a first end of the second torsion spring is disposed through the second slot, the first bracket comprises a first hole disposed therethrough and a second end of the first torsion spring is disposed through the first hole, and the first bracket comprises a second hole disposed therethrough and a second end of the second torsion spring is disposed through the second hole.

9. The hood hinge of claim 8, further comprising first and second spring locking brackets, wherein the first spring locking bracket is attached to the first flap and comprises a third hole disposed therethrough, wherein the first end of the first torsion spring is disposed through the third hole, and wherein the second spring locking bracket is attached to the second flap and comprises a fourth hole disposed therethrough, wherein the first end of the second torsion spring is disposed through the fourth hole.

10. The hood hinge of claim 1, wherein the hinge pin comprises a bolt and a nut.

11. A hood hinge for pivotally mounting a vehicle hood to a vehicle chassis, comprising:

a hood mounting bar adapted to mount a vehicle hood;

a housing tube having first and second open ends;

a first bracket fixedly connecting the hood mounting bar to the housing tube;

a rubber insulator disposed within each of the first and second ends of the housing tube;

a self-lubricated bushing disposed within each rubber insulator;

a second bracket adapted to be mounted to a vehicle chassis and having a base and first and second flaps extending from the base over the first and second ends of the housing tube, respectively;

first and second torsion springs, wherein:

the first torsion spring is disposed around the housing tube proximate to the first end of the housing tube, the first torsion spring having a first end attached to the first flap of the second bracket and a second end attached to the first bracket;

the second torsion spring is disposed around the housing tube proximate to the second end of the housing tube, the second torsion spring having a first end attached to the second flap of the second bracket and a second end attached to the first bracket; and a hinge pin disposed through the first and second flaps, the self-lubricated bushings, and the housing tube so that the housing tube and hood mounting bar are pivotable about the hinge pin relative to the second bracket, thereby enabling the vehicle hood to pivot between open and closed positions relative to the vehicle chassis and under a torsional bias applied by the first and second torsion springs.

12. The hood hinge of claim 11, wherein the first flap comprises a first slot disposed therethrough and a first end of the first torsion spring is disposed through the first slot, the second flap comprises a second slot disposed therethrough and a first end of the second torsion spring is disposed through the second slot, the first bracket comprises a first hole disposed therethrough and a second end of the first torsion spring is disposed through the first hole, and the first bracket comprises a second hole disposed therethrough and a second end of the second torsion spring is disposed through the second hole.

13. The hood hinge of claim 12, further comprising first and second spring locking brackets, wherein the first spring locking bracket is attached to the first flap and comprises a third hole disposed therethrough, wherein the first end of the first torsion spring is disposed through the third hole, and wherein the second spring locking bracket is attached to the second flap and comprises a fourth hole disposed therethrough, wherein the first end of the second torsion spring is disposed through the fourth hole.

14. The hood hinge of claim 13, wherein the base of the second bracket defines a plane.

15. The hood hinge of claim 14, wherein the first and second torsion springs are adapted to support the vehicle hood pivotally raised to an angle of about fifty degrees or more relative to the plane of the second bracket.

16. The hood hinge of claim 13, wherein the first bracket fixedly connects the hood mounting bar to the housing tube by welding, thereby forming a first subassembly.

17. A hood hinge for pivotally mounting a vehicle hood to a vehicle chassis, comprising:

a welded subassembly, comprising:

a hood mounting bar adapted to be fixedly attached to a vehicle hood;

a housing tube having first and second open ends; and a first bracket welded to the hood mounting bar and the housing tube;

a rubber insulator disposed within each of the first and second ends of the housing tube;

a self-lubricated bushing disposed within each rubber insulator;

first and second torsion springs, the first torsion spring disposed around the housing tube proximate to the first end of the housing tube and the second torsion spring disposed around the housing tube proximate to the second end of the housing tube;

a second bracket having a base and first and second flaps extending from the base over the first and second ends of the housing tube, respectively, wherein the base is adapted to be mounted to a vehicle chassis; and a hinge pin disposed through the first and second flaps, the self-lubricated bushings, and the housing tube;

wherein the first flap comprises a first slot disposed therethrough and a first end of the first torsion spring is disposed through the first slot, the second flap comprises a second slot disposed therethrough and a first end of the second torsion spring is disposed through the second slot, the first bracket comprises a first hole disposed therethrough and a second end of the first torsion spring is disposed through the first hole, and the first bracket comprises a second hole disposed therethrough and a second end of the second torsion spring is disposed through the second hole so that the first and second torsion springs are attached to the brackets and the housing tube and hood mounting bar are pivotable about the hinge pin relative to the second bracket, thereby enabling the vehicle hood to pivot between open and closed positions relative to the vehicle chassis and under a torsional bias applied by the first and second torsion springs.

18. The hood hinge of claim 17, further comprising first and second spring locking brackets, wherein the first spring locking bracket is attached to the first flap and comprises a third hole disposed therethrough, wherein the first end of the first torsion spring is disposed through the third hole, and wherein the second spring locking bracket is attached to the second flap and comprises a fourth hole disposed therethrough, wherein the first end of the second torsion spring is disposed through the fourth hole.

19. The hood hinge of claim 18, wherein the base of the second bracket defines a plane, and the hood mounting bar is adapted to mount a vehicle hood.

20. The hood hinge of claim 19, wherein the first and second torsion springs are adapted to support the vehicle hood pivotally raised to an angle of about fifty degrees or more relative to the plane of the second bracket.

* * * * *